United States Patent [19]

Lorenz

[11] Patent Number: 4,977,819

[45] Date of Patent: Dec. 18, 1990

[54] MACHINE FOR BREWING HOT BEVERAGES

[75] Inventor: Horst Lorenz, Solingen, Fed. Rep. of Germany

[73] Assignee: Robert Krups Stiftung & Co. KG., Solingen, Fed. Rep. of Germany

[21] Appl. No.: 187,374

[22] Filed: Apr. 28, 1988

[30] Foreign Application Priority Data

Apr. 30, 1987 [DE] Fed. Rep. of Germany ....... 8706245

[51] Int. Cl.$^5$ .............................................. A47J 31/00
[52] U.S. Cl. ...................................... 99/279; 126/215; 126/221
[58] Field of Search ................................. 99/279–284, 99/288, 295, 306, 324; 126/221, 212, 215; 219/521, 385, 386, 430, 444, 432, 433, 443, 218, 429, 434

[56] References Cited

U.S. PATENT DOCUMENTS

| | | | |
|---|---|---|---|
| 3,442,261 | 5/1969 | Berlik | 126/215 |
| 3,805,765 | 4/1974 | Nodae | 126/215 |
| 4,095,086 | 6/1978 | Ohnmacht | 219/283 |
| 4,406,942 | 9/1983 | Conti | 126/215 |
| 4,546,697 | 10/1985 | Schaeffer | 99/279 |
| 4,772,777 | 9/1988 | Weller | 99/281 |

FOREIGN PATENT DOCUMENTS 2299783  8/1976  Fed. Rep. of Germany .

Primary Examiner—Robert W. Jenkins
Attorney, Agent, or Firm—Peter K. Kontler

[57] ABSTRACT

A machine for brewing coffee, tea or other hot beverages has a hollow housing for a water heater which is disposed beneath and can directly heat a warming plate serving to support a pot, a carafe, a vacuum bottle, a cup or another vessel for a freshly brewed beverage which is being discharged from the chamber of a filter holder above the warming plate. If the nature of the material of the vessel is such that the bottom wall of the vessel should not be heated to an elevated temperature, the operator inserts a distancing element between the warming plate and the casing of the heater. The area of contact between the heater and warming plate on the one hand, and the distancing element on the other hand, can be selected with a view to ensure a desirable reduction from that rate of heat tranfer which takes place when the heater is in direct and large-area contact with the warming plate. The distancing element can be made of a single piece of metallic wire and is provided with a male locating member fitting into a socket in the casing of the heater to ensure that the distancing element is held in an optimum position between the heater and the warming plate.

15 Claims, 2 Drawing Sheets

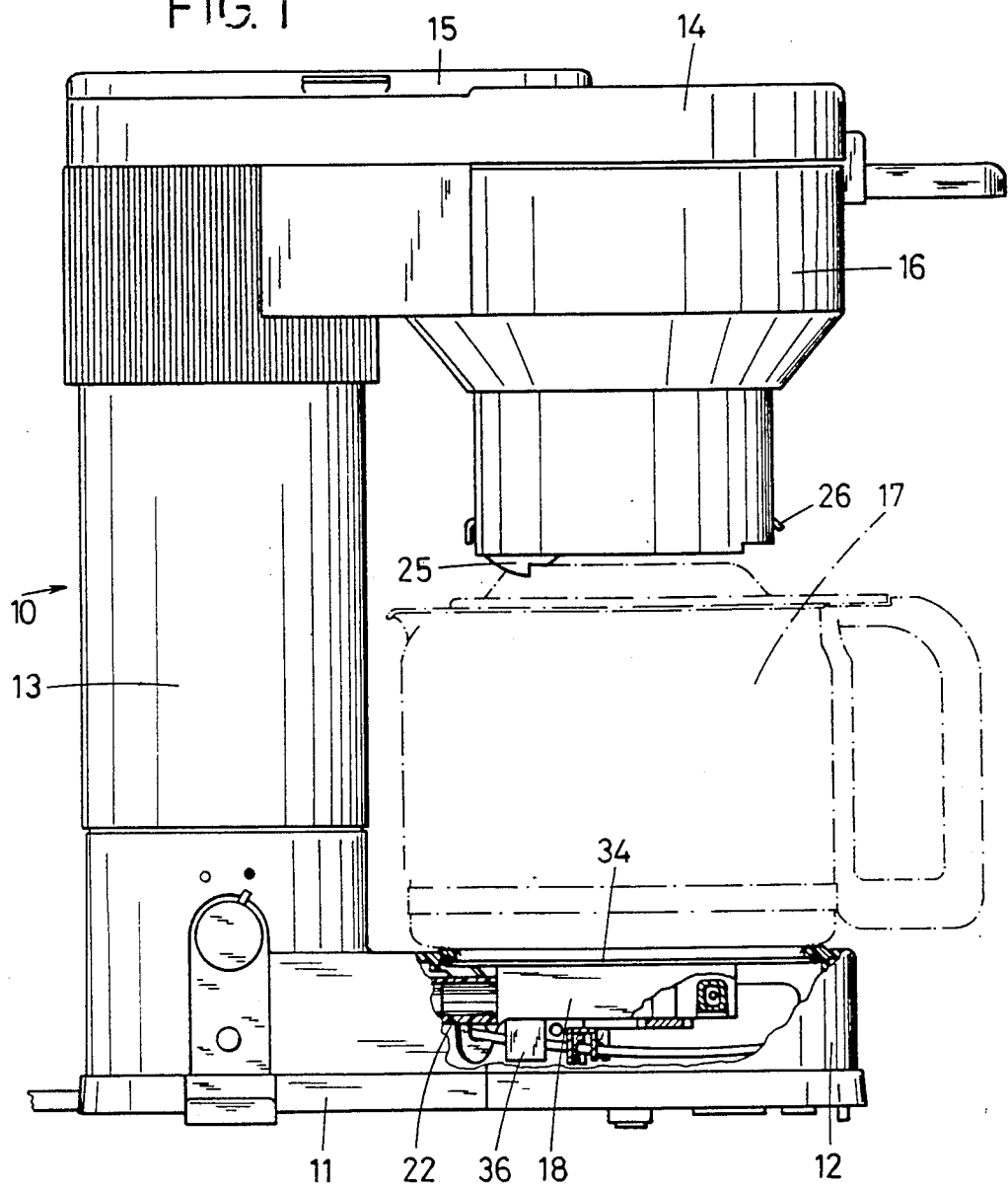
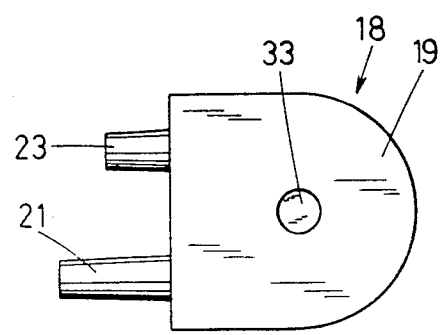

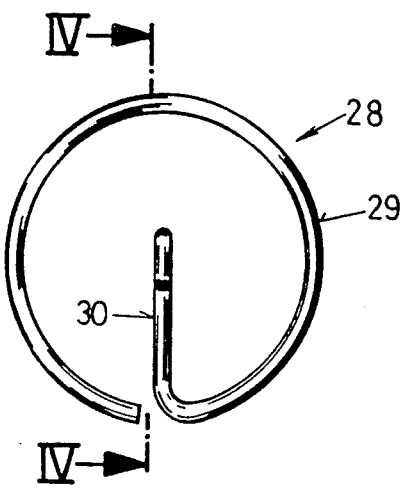
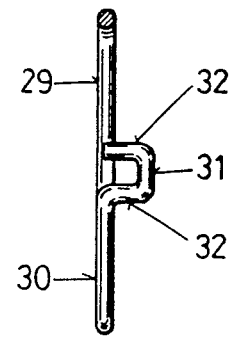
FIG. 3  FIG. 4
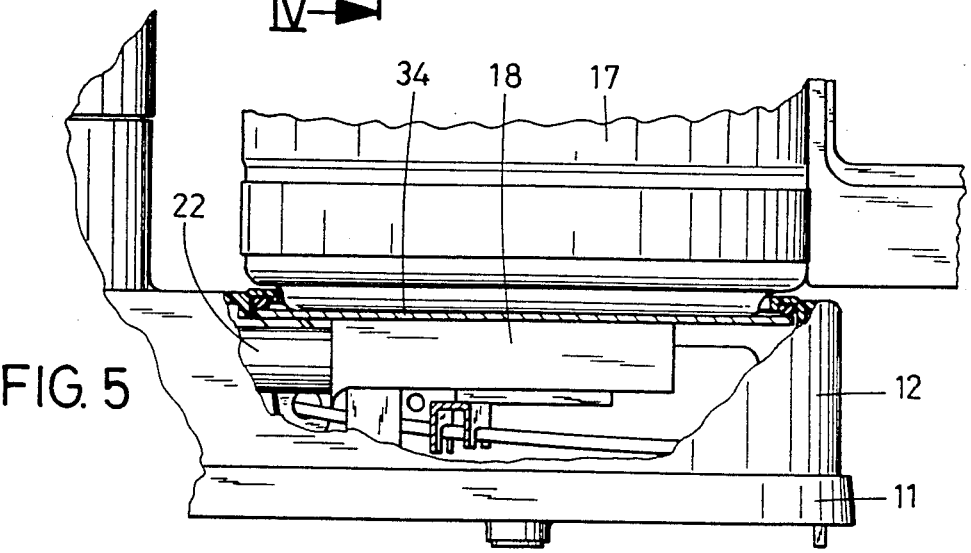
FIG. 5
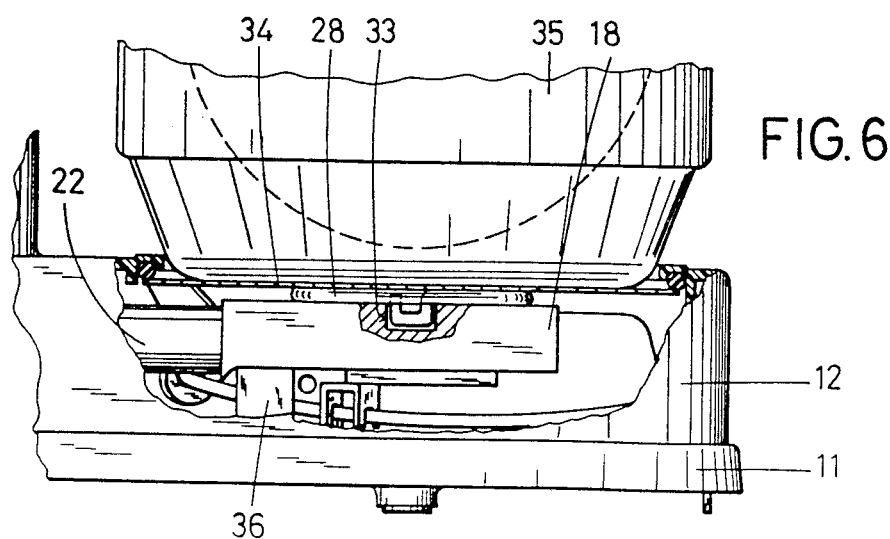
FIG. 6

MACHINE FOR BREWING HOT BEVERAGES

CROSS-REFERENCE TO RELATED CASES

The machine of the present invention is similar to the machines disclosed in the commonly owned copending patent applications Ser. Nos.: 184,682 and 184,683 filed by Henn et al. on Apr. 22, 1988 and Apr. 22, 1988, respectively.

BACKGROUND OF THE INVENTION

The invention relates to improvements in machines for brewing coffee, tea, cocoa, chocolate and other hot beverages. More particularly, the invention relates to improvements in machines of the type wherein the outlet for a freshly brewed beverage is disposed at a level above a support for a vessel which is to collect the dispensed beverage and the support is adjacent a heating unit, particularly an electric heater for water, milk or another liquid which is to be heated and thereupon contacted with comminuted coffee beans, comminuted tea leaves or another flavoring agent serving to influence the color, taste and/or aroma of the liquid.

It is well known to install in the housing of a coffee or tea making machine a container for a supply of liquid (such as water or milk) to be heated, a heating unit which serves to raise the temperature of the liquid, a filter holder, a conduit (such as a riser) which serves to convey heated liquid from the heating unit to the filter holder wherein the liquid is contacted by comminuted coffee beans or tea leaves, and a warming plate or another suitable support for a vessel which is to receive the freshly brewed beverage from the filter holder. The support is heated by the heating unit so that the temperature of the beverage which is collected by the vessel resting on the support is maintained within a desired range. The vessel can constitute a coffee pot, a tea pot, a thermos (vacuum) bottle or any other suitable receptacle for a freshly brewed beverage. A coffee or tea pot can be made of glass or porcelain, in contrast to a thermos which can comprise a bottle of glass or the like within a jacket of heat insulating material. Certain of these materials can stand elevated temperatures; therefore, the respective vessels can be placed directly onto a support which is in contact with an electric heater so that its temperature can reach a value at which a vessel made of other material would undergo permanent damage. For example, many types of glass can stand elevated temperatures and can divide the temperature uniformly or nearly uniformly all around the confined supply of a freshly brewed beverage. Such vessels are provided with handles of heat insulating material so that the operator of the machine can avoid direct contact with the glass wall of the vessel. Moreover, rapid distribution of heat which was transferred to such vessel by the intensively heated support of the coffee or tea making machine ensures that the temperature of the bottom part of the vessel rapidly decreases so that the bottom part can be placed onto a table, a counter or a like piece of furniture which is made of a heat-sensitive material without causing damage thereto. As a rule, or at least in many instances, the bottom part is made of a metallic material.

If the material is a vessel serving to store a freshly brewed hot beverage is a poor conductor of heat, the placing of such vessel directly onto an intensively heated warming plate or a like support results in excessive heating of the bottom part of the vessel so that the thus heated bottom part is highly likely or practically certain to destroy, damage or at least deface a table, a counter or another piece of furniture serving as a rest for the vessel. Attempts to overcome such problems include the establishment of direct or indirect heat transmitting connections between the heating unit and the support for vessels. Thus, if the bottom part of a vessel which is to be used with a particular machine is incapable of standing elevated temperatures or should not be heated to an elevated temperature because it is a relatively poor conductor of heat, the support is placed at a greater distance from the heating unit. Such undertaking reduces the likelihood of overheating certain types of vessels; however, the solution is rather primitive, impractical and expensive.

OBJECTS AND SUMMARY OF THE INVENTION

An object of the invention is to provide a novel and improved machine for brewing hot beverages which is constructed and assembled in such a way that the support for beverage-receiving vessels can be properly heated in a simple, reliable and inexpensive way.

Another object of the invention is to provide novel and improved means for changing the rate of heat transfer between the heating unit of a coffee making or like machine and the support for pots, carafes, cups, vacuum bottles and other types of vessels for freshly brewed beverages.

A further object of the invention is to provide a novel and improved method of converting a conventional machine for brewing hot beverages into a machine which exhibits the above outlined advantages.

An additional object of the invention is to provide novel and improved means for transmitting heat between an electric heating unit and a warming plate in a machine for brewing coffee, tea, cocoa or other hot beverages.

Still another object of the invention is to provide an electric heating unit which can be used in the above outlined machine.

Another object of the invention is to provide a machine which can be rapidly converted for intensive or less intensive transfer of heat between the heating unit and the support for vessels which gather freshly brewed coffee, tea or another hot beverage.

The invention is embodied in a machine for brewing hot beverages, such as coffee, cocoa, chocolate, tea and the like. The improved machine comprises a housing, a container for storage of a supply of liquid (e.g., water or milk) in the housing, an electric heating unit for liquid in the housing, a supporting unit (e.g., a warming plate) for cups, pots, carafes, vacuum bottles or other suitable beverage-receiving vessels adjacent the heating unit, and a distancing element which is interposed between the heating and supporting units and serves to reduce the transfer of heat from the heating unit to the supporting unit. The supporting unit can be disposed at a level above the heating unit, and the distancing element can constitute a single piece of metallic wire.

The machine preferably further comprises means for properly locating the distancing element with reference to the housing and/or with reference to at least one of the units. Such locating means can comprise a male locating member and a female locating member. One of the locating members is provided on the distancing element and the other of the locating members can be provided on or in the housing and/or on or in the one unit.

The distancing element can comprise a substantially annular first portion and a substantially straight second portion, and the one locating member can be provided on the second portion of such distancing element, particularly on or at that end of the second portion which is remote from the first portion. The second portion can extend substantially radially of and can be disposed within the annular first portion, and the one locating member can be disposed substantially centrally of the annular first portion of the distancing element. The first and second portions of the distancing element can be disposed in a common first plane, and the one locating member can be disposed in a second plate extending substantially at right angles to the first plane.

The female locating member can include a socket for the male locating member. The socket can be provided in the heating unit and can be bounded by a substantially circular surface. The male locating member can be provided with several surfaces each of which is adjacent or actually abuts the circular surface of the heating unit.

The distancing element can be removably installed between the heating and supporting units. The arrangement may be such that the supporting unit is installed in the housing at a predetermined level and the heating unit is disposed beneath the supporting unit and is adjustable relative thereto, namely the heating unit is movable nearer to or further away from the supporting unit depending upon whether or not the distancing element is necessary. The distancing element will be installed between the heating and supporting units if the supporting unit is to serve as a rest for a vessel which is incapable of standing elevated temperatures or is not supposed to be heated to an elevated temperature for another reason.

The novel features which are considered as characteristic of the invention are set forth in particular in the appended claims. The improved machine itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a schematic elevational view of a machine which embodies one form of the invention, with a portion of the housing and heating unit broken away, with the distancing element removed and with a pot indicated by phantom lines;

FIG. 2 is a plan view of the heating unit in the machine of FIG. 1;

FIG. 3 is a plan view of a distancing element for use in the machine of FIG. 1;

FIG. 4 is a sectional view of the distancing element as seen in the direction of arrows from the line IV—IV of FIG. 3;

FIG. 5 is an enlarged view of a detail in the machine of FIG. 1 with the distancing element removed so that the heating unit is immediately adjacent the supporting unit which supports the pot of FIG. 1; and FIG. 6 shows the structure of FIG. 5 but with the distancing element installed between the heating and supporting units and with a vacuum bottle on the supporting unit.

DESCRIPTION OF THE PREFERRED EMBODIMENTS

The machine 10 of FIG. 1 is designed to make coffee, tea or another hot beverage and includes an at least partially hollow housing including a base plate 11 and a hollow bottom portion 12 on top of the base plate. The bottom portion 12 confines an electric heating unit 18. An upright portion of the housing of the machine 10 constitutes or receives a relatively large container 13 for a supply of liquid (such as water or milk) to be heated by the unit 18. The top portion 14 of the housing carries a detachable or pivotably or slidably mounted cover or lid 15 which can be moved from the sealing position of FIG. 1 to afford access to the opening at the top of the container 13 so that the container can be refilled at required intervals. It is to be noted that the drawing shows only those parts of the improved machine 10 which are necessary for full understanding of the invention. For example, the drawing does not show the electric circuit for the heating unit 18, the means for connecting such circuit with an outside source of electrical energy, the various knobs, levers, switches and other controls which can be manipulated to regulate the temperature of heated liquid, and a conduit which conveys heated liquid from the heating unit 18 upwardly and into the interior of a filter holder 16 at a level above a supporting unit 34 in the form of a warming plate mounted in the bottom portion 12 of the housing above the heating unit 18. Those parts which are not shown in the drawing are, or can be, identical with corresponding parts of conventional machines for brewing hot beverages, for example, of coffee making machines distributed by the assignee of the present application. The details of means for conveying heated liquid from the heating unit to the filter holder are disclosed in the aforementioned commonly owned copending patent applications Ser. Nos. 184,682 and 184,683 and of Henn et al.

The base plate 11 can be placed onto a table, onto a counter or onto any other piece of furniture which is sufficiently close to an outlet so that the plug at the free end of the cord (not shown) of the machine 10 can be inserted into the outlet. In addition to the electric heating unit 18, the relatively large hollow bottom portion 12 of the housing of the machine 10 further confines the aforementioned controls and the electric circuit. The top portion 14 is parallel or nearly parallel to the base plate 11 and supports the filter holder 16 which can receive a hollow conical or otherwise configurated filter paper containing a supply of comminuted coffee beans, comminuted tea leaves or any other suitable flavoring agent which is to be used for the brewing of a hot beverage. The bottom part of the filter holder 16 carries a gate 25 which is pivotally secured thereto, as at 26, and can be moved between the illustrated sealing position and an opening position so as to permit escape of a freshly brewed beverage from the chamber of the filter holder into a pot 17 or a similar vessel (indicated in FIG. 1 by phantom lines) resting on the supporting unit 34. The manner in which the pot 17 can cause the gate 25 to move to open position when the pot is properly placed onto the supporting unit 34 is disclosed in the aforementioned copending patent applications Ser. Nos. 184,682 and 184,683 of Henn et al. The upper portion of the filter holder 16 has an intake (such as a horizontal pipe) which is connected to the upper end of the aforementioned conduit (riser) or to a manifold which contains a valving element serving to return the liquid into the container 13 if the temperature of liquid rising in the conduit does not suffice for the brewing of a satisfactory beverage. If the temperature of heated liquid in the conduit is sufficiently high, the valving element undergoes deformation to assume a position in which the conduit is sealed from the container 13 but is free to discharge heated liquid into the filter holder 16. The pivot 26 for the gate 25 is mounted on a cylindrical skirt-like wall of the filter holder 16 closely above the top portion of the pot 17 on the supporting unit 34. The gate 25 can comprise a lever which is turnable (at 26) about a horizontal pivot axis and carries a spring-biased valving element which normally seals an outlet opening in the bottom wall of the filter holder 16. The lever moves the valving element away from the outlet opening when pivoted in a clockwise direction, either by hand or automatically by the top part of the pot 17 when the latter is properly placed onto the supporting unit 34 above the heating unit 18. The lever of the gate 25 automatically reassumes a position in which the outlet opening in the bottom wall of the filter holder 16 is sealed as soon as the pot 17 is removed from the supporting unit 34. The lever of the gate 25 is preferably provided with a cam face which is engageable by the pot 17 while the latter slides along the supporting unit 34, and with a stop which is engaged by the top part of the pot 17 when the latter reaches an optimum position for reception of a stream of a freshly brewed hot beverage in response to exposure of the outlet opening in the bottom wall of the filter holder 16. The pot 17 is assumed to be made mainly of glass and has a handle made of a material which is a poor conductor of heat. It is assumed that the bottom wall of the pot 17 can rapidly dissipate heat to the confined beverage and to the surrounding atmospheric air so that it can be removed from the supporting unit 34 and placed onto a piece of furniture without damaging or defacing the latter.

The details of the heating unit 18 are shown in FIG. 2. This heating unit is designed to heat successive increments of a stream of liquid flowing from the container 13 to the aforementioned manifold and thence back into the container 13 or into the filter holder 16, depending on the temperature of the heated liquid. A hose 22 (FIG. 1) or another suitable conduit is provided to convey unheated or partially heated liquid from the outlet of the container 13 to a nipple 21 of the heating unit 18. The liquid then flows through the casing 19 of the heating unit 18 and is discharged via nipple 23 which is connected with the aforementioned riser so that the stream of heated liquid can flow toward and into the manifold on its way back into the container 13 or into the filter holder 16.

As shown on a larger scale in FIG. 5, the supporting unit 34 can directly contact the top wall of the casing 19 of the heating unit 18 when the nature of the vessel (pot 17) is such that the bottom wall of the vessel can be heated to an elevated temperature. At such time, the transfer of heat between the heating unit 18 and the bottom wall of the vessel 17 (through the medium of the supporting unit 34) is very intensive.

If the vessel (pot) 17 of FIGS. 1 and 5 is replaced with a different vessel 35 (FIG. 6) which constitutes, for example, a thermos (vacuum bottle) with a glass bottle confined in a jacket of heat insulating material which is a poor conductor of heat and should not be heated to an elevated temperature, the machine 10 is modified in that a novel and improved distancing element 28 (e.g., a single piece of metallic wire) is installed between the heating unit 18 and the supporting unit 34. The jacket of the vessel 35 should not be heated to an elevated temperature because it does not readily dissipate heat so that, if it were heated in a manner as shown for the pot 17 of FIGS. 1 and 5, the temperature of its bottom wall would rise to a value at which the bottom wall could damage or deface a table, a counter or another piece of furniture in a kitchen, in a diner, in a restaurant, in an office or in any other establishment where the machine 10 is put to use.

As can be seen in FIGS. 3, 4 and 6, the area of contact between the distancing element 28 and the top wall of the casing 19 of the heating unit 18 is relatively small so that the rate at which the supporting unit 34 is heated by the heating unit 18 is a small fraction of the heating action upon the supporting unit 34 when the latter is in direct contact with the top wall of the casing 19. FIGS. 3 and 4 show that the distancing element 28 comprises a substantially annular first portion 29 which is integral with one end of a substantially straight second portion 30. The other end of the second portion 30 is disposed substantially centrally of the annular first portion 29 and is integral with a male locating member 31 forming part of a means for properly locating the distancing element 28 with reference to the housing portion 12, casing 19 of the heating unit 18 and supporting unit 34. In the embodiment which is shown in the drawing, the male locating member 31 cooperates with a female locating member which is provided in the top wall of the casing 19 and has a socket 33 bounded by a substantially circular surface which is contacted by the surfaces 32 of the male locating member 31 when the latter is received in the socket 33. This ensures that the distancing element 28 assumes an optimum position relative to the units 18, 34 and housing portion 12. The portions 28, 29 of the distancing element 28 are located in a first plane which is parallel to the plane of the supporting unit 34 when the distancing element 28 is held in the position of FIG. 6, and the male locating member 31 is located in a second plane which is or can be normal to the common plane of the portions 28, 29.

The machine 10 can be furnished with a set of distancing elements 28 each of which has a different thickness to thus determine the mutual spacing of the heating unit 18 and supporting plate 34. If the diameter of wire which is used for the making of a distancing element 28 is relatively small, the top wall of the casing 19 can indirectly heat the vessel 35 to a higher temperature (through the medium of the distancing element and supporting unit as well as through the medium of the supporting unit and the relatively thin layer of air between the supporting unit and the casing 19). The heating acting upon the vessel 35 is less pronounced if the diameter of the wire which is used for the making of the distancing element 28 is larger.

The distancing element 28 can be mass produced in a wire forming machine which repeatedly draws predetermined lengths of wire from a reel or another source, severs the withdrawn lengths from the remainder of the supply of wire, and deforms the severed lengths so that each such length is converted into a distancing element with an annular portion 29, a straight portion 30 and a male locating member 31. The mode of converting a severed length of wire is preferably such that the annular portion 29 is formed in a first step, the straight portion 30 is thereupon bent substantially radially and inwardly of the annular portion 29, and the male locating member 31 is made in a last step or simultaneously with the step of bending the portion 30 relative to the portion 29. As mentioned above, the male locating member 31 is or ca be located at the exact center or close to the center of the annular portion 29. The male locating member 31 has the shape of a U with a web which is receivable in the deepmost portion of the socket 33 and with two legs having external surfaces 32 which can abut or come close to the circular surface bounding the socket 33 in the top wall of the casing 19 of the heating unit 18. Save for the provision of the socket 33 in the top wall of its casing 19, the heating unit 18 can be of conventional design. The mutual spacing of the surfaces 32 is preferably only slightly less than the diameter of the circular surface bounding the socket 33 so that the male locating member 31 can be readily installed in the socket but need not or cannot wobble relative to the casing 19. This ensures that the properly installed distancing element 28 invariably assumes and remains in an optimum position relative to the housing portions 11, 12 as well as with reference to the units 18, 34 as soon as the male locating member 31 enters the socket 33.

The manner in which the distancing element 28 can be installed between the units 18, 34 or removed from the interior of the bottom portion 12 of the housing of the machine 10 is not specifically shown in the drawing. For example, the bottom portion 12 of the housing can have a slot or a door which affords access to its interior and permits insertion of the distancing element 28 between the units 18, 34 or its extraction from the bottom portion 12. The casing 19 of the heating unit 18 can be biased upwardly by a spring 36 so that it tends to assume the position of FIGS. 1 and 5 (in contact with the underside of the supporting unit 34). The spring 36 yields when the distancing element 28 is located between the units 18, 34 and such spring thereupon biases the casing 19 against the distancing element and the distancing element against the underside of the supporting unit 34.

The improved distancing element 28 can be modified in a number of ways. For example, the distancing element can have an oval, triangular, square, rectangular or any other polygonal shape, and it can comprise two or more annular portions so as to increase the area of contact with the units 18, 34. Moreover, the illustrated male locating member 31 can be replaced with an otherwise configured or dimensioned locating member. Still further, the male locating member can be provided on the supporting unit 34, on the heating unit 18 or on the bottom portion 12 of the housing, and the female locating member can be provided on or in the distancing element. All that counts is to ensure that the transfer of heat from the heating unit 18 to the vessel on the supporting unit 34 is satisfactory as well as that the properly inserted distancing element can be located and maintained in an optimum position with reference to the units 18, 34 and housing of the machine 10. It is even possible to employ a composite distancing element which can be assembled of several sections so that one or more sections can be removed if the transfer of heat should be less pronounced and one or more sections are reinserted between the units 18, 34 if the transfer of heat to a particular vessel should be more pronounced.

It is also within the purview of the invention to provide discrete locating means which can be attached to the selected distancing element 28 and to one of the parts 18, 34, 12 to releasably hold the distancing element in proper position between the units 18 and 34. However, the illustrated design is preferred because it contributes to simplicity and lower cost of the machine since the male and female locating members constitute integral parts of the existing components of the machine.

Still further, the socket 33 in the top wall of the casing 19 of the heating unit 18 can be reached by removably installing the supporting unit 34 in the bottom portion 12 of the housing.

An important advantage of the improved machine is its versatility. Moreover, the rate at which the bottom wall of a vessel (17, 35 or any other suitable vessel) is being heated can be selected with a high degree of accuracy and reproducibility. The distancing element can be mass-produced in an existing or available machine and such machine can be made a part of a production line for the making of machines 10. A one-piece distancing element which is made of wire is preferred at this time because such distancing elements can be made at a low cost. The machine which is used for the making of such distancing elements must merely employ a cutter and suitable wire bending instrumentalities to form the portions 29, 30 and the male locating member 31. Though it is possible to make the distancing element of a non-metallic material, it is presently preferred to employ distancing elements which are made of a metallic wire. As already mentioned above, the transfer of heat can be regulated in a simple but effective way by the expedient of properly selecting the diameter of the wire which is used to make the distancing element.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. Machine for brewing hot beverages, comprising a housing; a container for storage of a supply of liquid in said housing; a heating unit for liquid in said housing; a supporting unit for beverage-receiving vessels adjacent said heating unit, one of said units being movable toward and away from the other of said units; and a distancing element removably installed between said units and arranged to maintain said units at a selected minimum distance from each other irrespective of the temperature of said heating unit and to permit said one unit to move to a position at a different second distance from said other unit upon removal of said distancing element between said units.

2. The machine of claim 1, wherein said supporting unit includes a warming plate which is disposed at a level above said heating unit.

3. The machine of claim 1, further comprising means for locating said distancing element with reference to at least one of said units and/or with reference to said housing.

4. The machine of claim 1, wherein said distancing element consists of or contains a metallic material.

5. Machine for brewing hot beverages, comprising a housing; a container for storage of a supply or liquid in said housing; a heating unit for liquid in said housing; a supporting unit for beverage-receiving vessels adjacent said heating unit; a distancing element interposed between said units and arranged to reduce the transfer of heat from the heating unit to the supporting unit; and means for locating said distancing element with reference to at least one of said units and/or with reference to said housing, said locating means comprises a male locating member and a female locating means, one of said locating members being provided on said distancing element and the other of said locating members being provided on said one unit.

6. The machine of claim 5, wherein said distancing element comprises a substantially annular first portion and a substantially straight second portion rigid with said first portion, said one locating member being provided on said second portion.

7. The machine of claim 6, wherein said second portion includes a first end rigid with said first portion and a second end, said one locating member being provided at said second end.

8. The machine of claim 6, wherein said second portion is disposed substantially radially of and within said first portion, said one locating member being disposed substantially centrally of said first portion.

9. The machine of claim 6, wherein said first and second portions are disposed in a first plane and said one locating member is disposed in a second plane extending substantially at right angles to said first plane.

10. The machine of claim 9, wherein said female locating member includes a socket for said male locating member.

11. The machine of claim 10, wherein said socket is provided in said heating unit.

12. The machine of claim 10, wherein said one unit has a substantially circular surface surrounding said socket, said male locating member having a plurality of surfaces abutting or being closely adjacent said circular surface.

13. The machine of claim 5, wherein said distancing element is removably installed between said units.

14. The machine of claim 13, wherein said supporting unit is disposed in said housing at a predetermined level and said heating unit is disposed beneath said supporting unit and is movable away from said supporting unit beyond said minimum distance.

15. Machine for brewing hot beverages, comprising a housing; a container for storage of a supply of liquid in said housing; a heating unit for liquid in said housing; a supporting unit for beverage-receiving vessels adjacent said heating unit; and a distancing element constituting a piece of wire and being interposed between said units to maintain said units at a selected minimum distance from each other irrespective of the temperature of said heating unit.

* * * * *